Dec. 23, 1930.  M. MORÁNSZKY  1,786,217
AEROPLANE
Filed Feb. 13, 1929
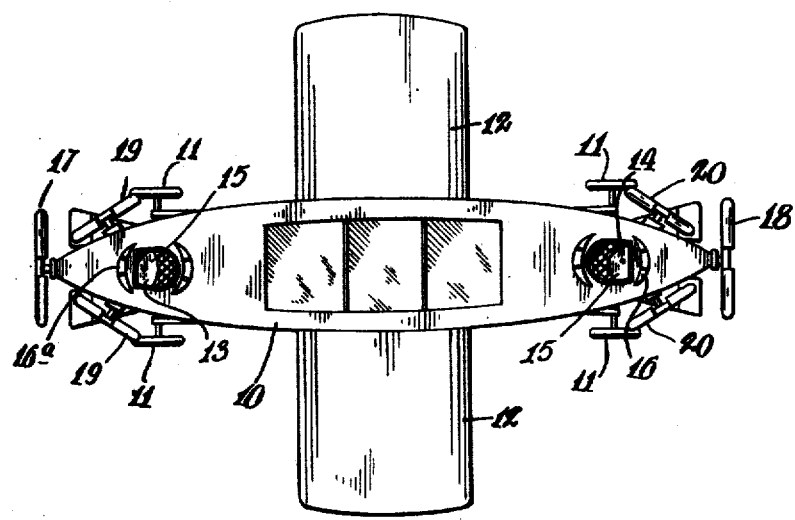
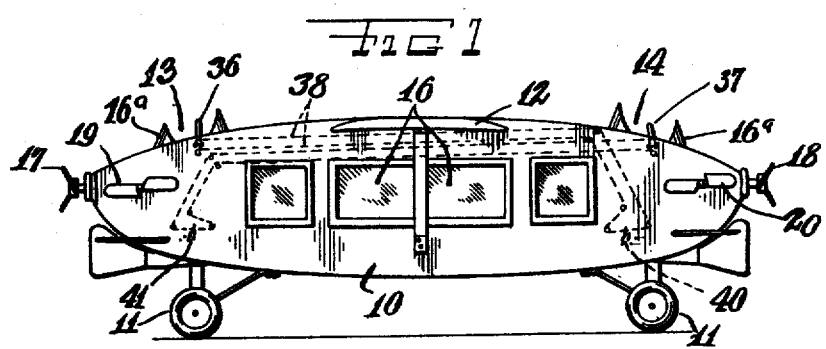
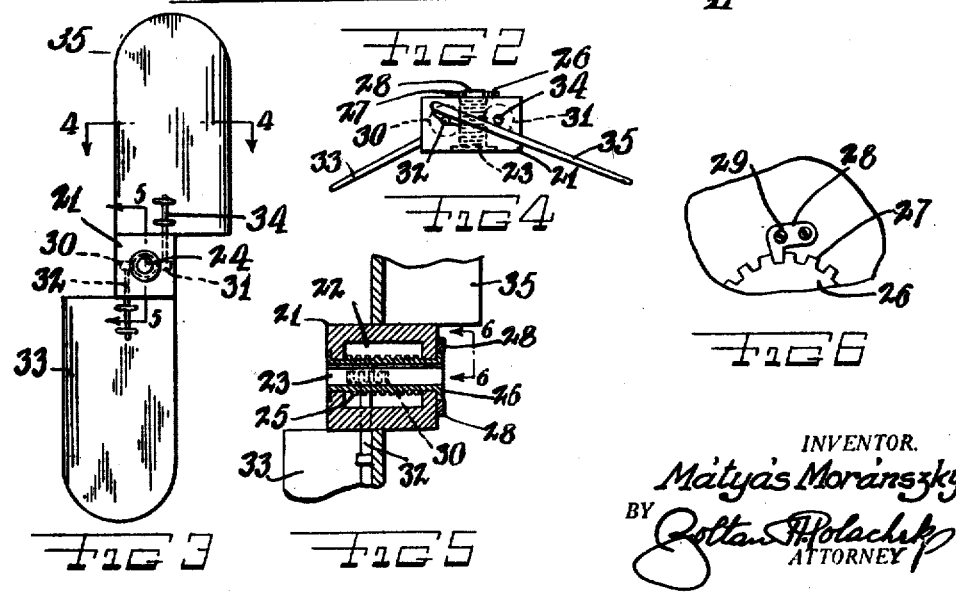
INVENTOR.
Mátyás Moránszky
BY
Zoltan H Polachek
ATTORNEY Patented Dec. 23, 1930

1,786,217

UNITED STATES PATENT OFFICE

MÁTYÁS MORÁNSZKY, OF NEW YORK, N. Y.

AEROPLANE

Application filed February 13, 1929. Serial No. 339,532.

This invention relates generally to aeroplanes and has more particular reference to a novel aeroplane provided with propellers arranged to add to the efficiency of the plane in flying.

The invention has for an object the provision of the device of the class mentioned which is of simple durable construction, desirable in use and efficient in action, and which can be manufactured and sold at a reasonable cost.

The invention proposes the use of an aeroplane body provided with wings, front and rear pilots' chambers, and with front and rear propellers. The body is provided with doors communicating with the said chambers and with windows. Each of the propellers have propeller wings arranged for simultaneous adjustments relative to their pitches.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:—

Fig. 1 is a plan view of a device constructed according to this invention.

Fig. 2 is a side elevational view thereof.

Fig. 3 is a front elevational view of one of the propellers of the device.

Fig. 4 is a horizontal sectional view taken on the line 4—4 of Fig. 3.

Fig. 5 is a fragmentary vertical sectional view taken on the line 5—5 of Fig. 3.

Fig. 6 is a fragmentary elevational view looking in the direction of the arrows 6—6 of Fig. 5.

The reference numeral 10 indicates generally an aeroplane body provided with a landing gear 11, and with wings 12. The body 10 is provided with a front pilot's chamber 13, a rear pilot's chamber 14, and doors 15 communicating with these chambers. Windows 16 are formed in the sides of the body 10, and shields 16ª are mounted on the body 10 for shielding the pilots' chambers.

A front propeller 17 is arranged on the front of the body, a rear propeller 18 on the rear thereof, a pair of front angularly directed propellers 19 on the front of the device, and a pair of rear angularly directed propellers 20 on the rear of the body, the said angularly directed propellers being arranged with one propeller on each side of the body 10 as clearly shown in Figs. 1 and 2.

Each of the propellers has a central block 21 formed with a cavity 22. A tubular member 23 formed with a key-way 24 is rotatively mounted within the block 21 and its central portion is formed with external worm threads 25. These worm threads are disposed within the cavity 22. One end of the tubular member 23 is formed with an end flange 26 having peripheral teeth 27 and pawls 28 are pivotally mounted upon the block 21 and arranged for engaging these teeth for holding the tubular member against rotation. Screws 29 pass through the pawls and threadedly engage in the block 21 for holding the pawls fixed in engaged positions against the said teeth 27.

A worm wheel 30 and a second worm wheel 31 are mounted on opposite sides of the tubular member 23 and engage the worm threads 25. A shaft 32 is fixed to the worm wheel 30 and supports a propeller wing 33. A shaft 34 is fixed to the worm wheel 31 and extends in the opposite direction to the shaft 32 and supports a second propeller wing 35. These propeller wings are located at opposite sides of the block 21.

The propellers on the front and on the rear of the aeroplane may have the same or opposite pitches for simultaneous operation in directing the aeroplane in one direction, or for individual operation for directing the aeroplane in one or the other direction. The pitch of each of the propellers may be adjusted by removing the screws 29, manually disengaging the pawls 28 and turning the tubular members 23 for simultaneously revolving the propeller wings 33 and 35 to desired adjusted pitches. The pawls and screws may be reengaged to hold the end flange 26 against rotation for fixing the propeller wings in their new adjusted positions.

Control levers 36 and 37 are provided to open or close ignition switches 40 and 41 of the engines that operate the propellers by manipulating cables 38 and 39 respectively.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

A propeller comprising a central hollow block, a plurality of blades, shafts on said blades rotatably mounted in said block, the axes of said shafts lying in the general plane of rotation of the propeller but being out of alignment, a cylindrical member adapted to be secured to the main propeller shaft rotatably mounted in said block and having worm threads on its outer side, worm wheels on said first named shafts in engagement with said worm threads, a flange on said cylindrical member on the outer side of said block, a plurality of teeth in said flange, a pawl pivotally mounted on said block and adapted to engage said teeth, and means for holding said pawl in engagement with said teeth to prevent rotation of said cylindrical member in said block.

In testimony whereof I have affixed my signature.

MÁTYÁS MORÁNSZKY.